United States Patent [19]

Van Linden et al.

[11] 4,191,559
[45] Mar. 4, 1980

[54] SKIM REMOVAL

[75] Inventors: Jan H. L. Van Linden, Allison Park; Ronald E. Miller, Murrysville; Joseph R. Herrick, Verona, all of Pa.

[73] Assignee: Aluminum Company of America, Pittsburgh, Pa.

[21] Appl. No.: 856,339

[22] Filed: Dec. 1, 1977

[51] Int. Cl.² ............................................... C22B 21/06
[52] U.S. Cl. .......................................... 75/68 R; 75/24
[58] Field of Search ................................. 75/68 R, 24

[56] References Cited

U.S. PATENT DOCUMENTS

| 3,043,678 | 7/1962 | Lowry et al. | 75/68 R |
|---|---|---|---|
| 3,632,096 | 1/1972 | Perry | 75/24 UX |
| 3,737,305 | 6/1973 | Blayden et al. | 75/68 R |
| 3,770,424 | 11/1973 | Floyd et al. | 75/68 R |
| 3,798,024 | 3/1974 | Murphy et al. | 75/68 R |
| 3,867,132 | 2/1975 | Perry | 75/24 X |
| 3,923,499 | 12/1975 | Manthey et al. | 75/24 |
| 3,955,970 | 5/1976 | Claxton et al. | 75/68 R |
| 3,979,108 | 9/1976 | Nagasaki et al. | 75/24 UX |

*Primary Examiner*—M. J. Andrews
*Attorney, Agent, or Firm*—Andrew Alexander

[57] ABSTRACT

A method of removing skim from molten metal comprises providing a body of molten metal and passing a fluxing gas therethrough to carry skim to the surface of the metal. The skim on the surface is treated to substantially reduce the amount of molten metal contained therein and to provide the skim in a substantially powdery form. A portion of the treated skim in finely divided form is removed to a collector.

13 Claims, 4 Drawing Figures

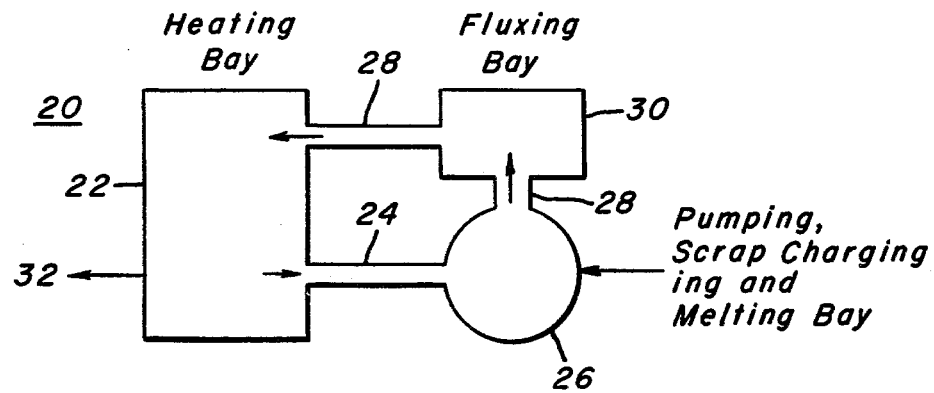
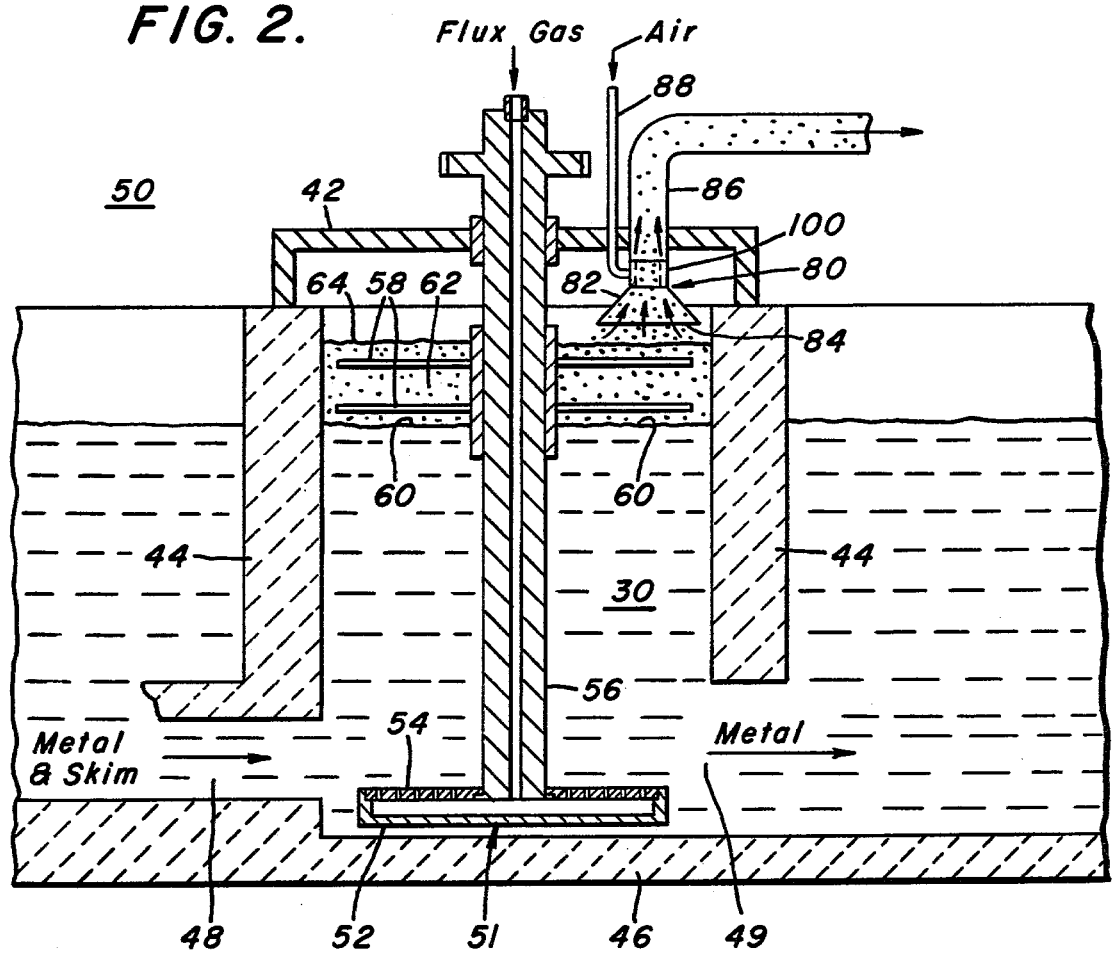

SKIM REMOVAL

INTRODUCTION

This invention relates to molten metals and more particularly it relates to removing skim from molten metals such as aluminum.

Skim or dross normally associated with aluminum is usually comprised of a mixture of oxides, nitrides or carbides of aluminum which contains a high level of metallic or free aluminum. It will be understood that the skim can contain other non-metallic impurities, such as refractories. Further, it should be noted that the free aluminum entrained in the mixture can be 95% or higher of the total weight of the skim. Thus, it will be apparent that it is highly desirable to reclaim such free aluminum.

In the prior art, the skim is usually removed from the surface of the molten metal by raking, for example, and thereafter processed to remove the free metal. That is, the prior art normally involves two steps in order to recover the free metal from the process. For example, U.S. Pat. No. 3,043,678 discloses that dross which has been removed from a melting furnace is treated in a rotary furnace with a predetermined amount of salt flux for purposes of removing free metal from the dross. Also, U.S. Pat. No. 3,798,024 discloses that skim or dross on a body of molten aluminum is removed to a preheat skim pot where melted salt flux is added and, after stirring, molten metal separated from the residual skim solids is recovered. In another process for recovering free aluminum from skim, U.S. Pat. No. 3,770,424, it is disclosed that skim is comminuted in a ball mill and the product is separated into a coarse and fine fraction, the coarse fraction being substantially metal. As noted above in these processes, the dross or skim has to be removed from the furnace for treatment purposes which can result in even more of the free aluminum being lost by being converted to its oxide.

The present invention circumvents a large number of the problems in the prior art by permitting the continuous separation of free aluminum from dross or skim without its being raked or removed from the surface of the molten aluminum prior to separation.

SUMMARY OF THE INVENTION

An object of the present invention includes removing dross or skim from molten metal.

Another object of the present invention includes separating dross or skim from molten aluminum.

And yet another object of the present invention includes substantially decreasing the amount of molten aluminum entrained in skim.

These and other objects will become apparent from the drawings, specification and claims appended hereto.

In accordance with these objects, a method of recovering free metal in skim or dross comprises providing a body of molten metal and passing a fluxing gas therethrough to carry the skim to the surface. The skim on the surface is treated to reduce the amount of free metal contained therein and to provide the treated skim in a powdery form. A portion of the treated skim is removed to a collecting station preferably utilizing a suction means.

BRIEF DESCRIPTION OF THE DRAWINGS

FIG. 1 is a general schematic of a circulatory melting system.

FIG. 2 is an elevational view in cross section illustrating the removal of treated skim from molten metal.

DETAILED DESCRIPTION OF THE PREFERRED EMBODIMENTS OF THE INVENTION

Figure 3:
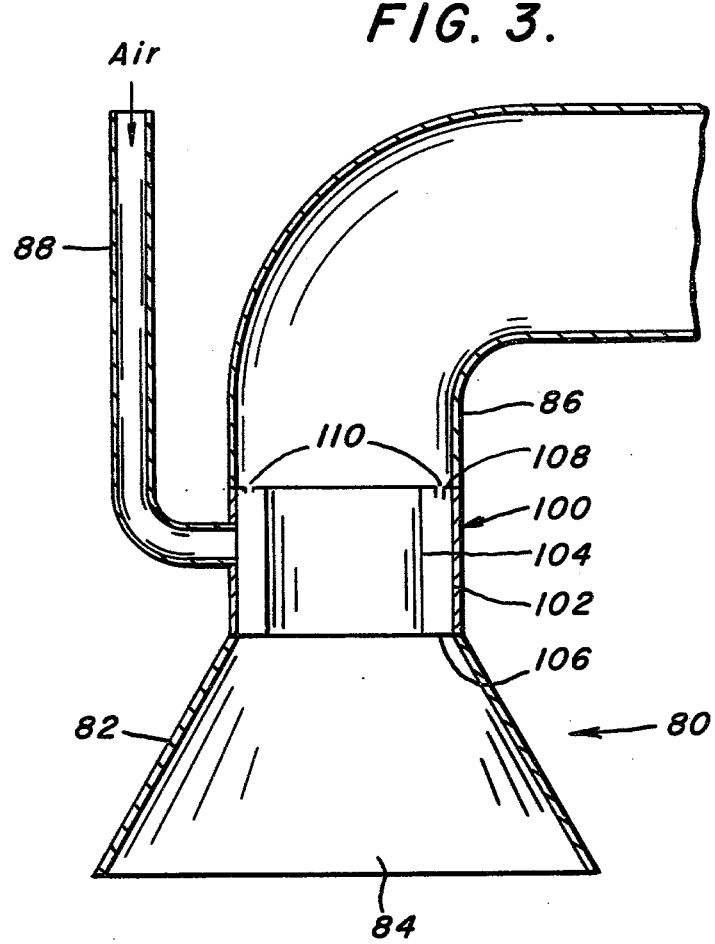
FIG. 3 is an enlarged view in cross section of an aspirator in accordance with the principles of the invention.

Referring now more specifically to FIG. 1, there is shown a schematic of a typical circulatory melting system 20 in which the present invention may be used. In circulatory melting system 20, molten melting media is circulated from the heating bay 22 along line 24 to a bay 26 wherein pumping, scrap charging and melting may be accomplished. Thereafter, the melt is circulated back to the heating bay 22 via line 28 which passes through a fluxing bay 30. The heating bay can have a discharge line 32 which can discharge molten metal at a rate commensurate with the feed rate of scrap to bay 26.

The melting media may be heated in heating bay 22 by combustion units discharging their heat upon its surface. Alternatively, electric resistance heaters immersed in the molten media may be used.

The melting media can be molten metal of similar composition to the metal charge or it may be a molten salt. If a molten salt is used, a salt-metal separation would normaly be necessary to facilitate the removal of the melted metal. When molten aluminum is the melting media, a typical temperature leaving the heating bay 22 is about 1400° F. although this temperature can range from 1325° to 1475° F. but with a higher temperature there is a greater tendency to form skim. A typical temperature reentering heating bay 22 is about 1300° F. This provides about a 100° F. temperature drop across the melting bay to provide heat to melt the charge.

In this type of system, a certain amount of skim is generated by virtue of the scrap melting process. Thus, it is in this type of operation that the present invention has particular application for the efficient removal of skim.

By reference to FIG. 2, there is shown, in essentially diagrammatical form, an apparatus referred to generally as 50 suitable for removing skim from a body of molten aluminum in accordance with the invention. With respect to one aspect of the invention, as shown in FIG. 2, the skim is treated to recover available aluminum contained therein prior to its being removed from the body of molten aluminum. The apparatus comprises a fluxing bay 30 having side walls 44 and bottom wall 46. An extrance 48 is provided for purposes of introducing molten metal to bay 30 from a heating bay, for example. An exit 49 is provided for purposes of removing or returning treated metal from fluxing bay 30 to the heating bay.

A gas diffuser, referred to generally as 51, is located within fluxing bay 30 for purposes of distributing fluxing gas. The gas diffuser illustrated comprises a generally cup-shaped member 52 having a perforated or porous covering 54 thereon for purposes of distributing fluxing gas into the molten metal. Diffuser 51 may be mounted on hollow shaft 56, as shown in FIG. 2, for purposes of introducing the fluxing gas thereto. It will be noted that diffuser 51 should preferably be located substantially as shown in FIG. 2 so as to permit entering molten metal containing skim to pass thereover so that the fluxing gas may efficiently remove such skim by carrying or lifting it to the surface of the molten metal.

Hollow shaft 56 is suitably mounted on cover 42 to permit rotation of the shaft. Mounted on shaft 56 are prongs or fingers 58 which may be rotated with the shaft. The prongs are located on the shaft preferably above surface 60 of the molten aluminum. On fluxing, a layer 62 of skim will accumulate on the surface of the molten metal and, as noted earlier, this skin layer can be very high if free aluminum which if simply raked off can result in a very high melt loss with respect to the aluminum. Thus, in accordance with the present invention, the action of prongs 58 serves to reduce the amount of free aluminum contained in the skim layer. That is, the action of the prongs is believed to divide or break up the skim particles permitting free aluminum to escape, coalesce and return to the body of molten aluminium. In addition, action of the fluxing gas is believed to assist in carrying the smaller particles of skim towards surface 64 of the skim layer. It is this general type of action which functions to substantially lower the amount of free aluminum contained in the skim. This treatment acts to change the skim into finely divided, powder form.

By reference now to FIG. 2, it will be seen that a suction means, referred to generally as 80, is provided to remove the finely divided particles of treated skim from skim layer 62. Suction means 80, as illustrated in FIG. 2, comprises a funnel shaped portion 82 having a mouth 84. Mouth 84 is located with respect to the skim layer such that suction provided in suction means 80 removes the finely divided particles of skim. In the suction means shown in FIG. 2 it will be noted that the narrow end of funnel shaped portion 82 is connected to a tubular member 86 which conveys the fine particles of treated skim to a collector (not shown). Suction in the embodiment shown in FIG. 2 is achieved by means of introducing air through line 88 into aspirator 100 located more or less adjacent the juncture of the funnel shaped portion and tubular member. It will be noted that cover 42 substantially encloses bay 30 thereby aiding in the exhaust of bay 30 being channeled through suction means 80. In addition, it will be noted the fluxing gas will also be directed through suction means 80.

In FIG. 3 is shown an enlarged view of an aspirator 100 suitable for removing finely divided particles of treated skim. Aspirator 100 comprises a plenum 102 whose outer wall is defined by the wall of conduit 86. Plenum 102 is further defined by walls 104, 106 and 108. Wall 108 has openings 110 therein to permit air introduced to plenum 102 through pipe 88 to escape into conduit 86 thereby creating suction action to remove the finely divided particles of treated skim. As well as creating the suction action, the air serves to cool the wall of conduit 86 and the treated skim particles preventing any appreciable accumulation of molten metal thereon and subsequent blocking of the conduit.

It will be understood that while a specific embodiment has been illustrated in FIG. 2, for purposes of providing suction to remove the finely divided particles of skim, any means which provides suction to this end is contemplated to be within the purview of the invention. Also, it will be noted that mechanical means such as a rotating auger or scoop means may be used to remove the powdered material.

With respect to fluxing, gases suitable for molten aluminum include the so-called inert gases; namely, helium, neon, argon, kryton, xenon, along with nitrogen, carbon dioxide and mixtures of these gases. In addition, chlorinaceous gas such as chlorine may be used individually or combined with the above gases.

It will be appreciated that the amount of suction may be varied depending to a large extent on the treating which is desired to be imparted to the skim. Thus, the rate of removal of the dried, finely divided, skim particles can be controlled by the amount of suction used. In addition, it is preferred that mouth 84 of funnel shaped portion 82 be adjusted so that it is located in the range of 1 to 4 inches from surface 64. It should be noted that the greater the distance from the funnel mouth to the surface 64, the finer the particle size and the lower the removal rate. Thus, the removal rate can be controlled in this way. It will be appreciated that the thickness of the skim layer can vary, depending to some extent on the skim generation rate.

Figure 4:
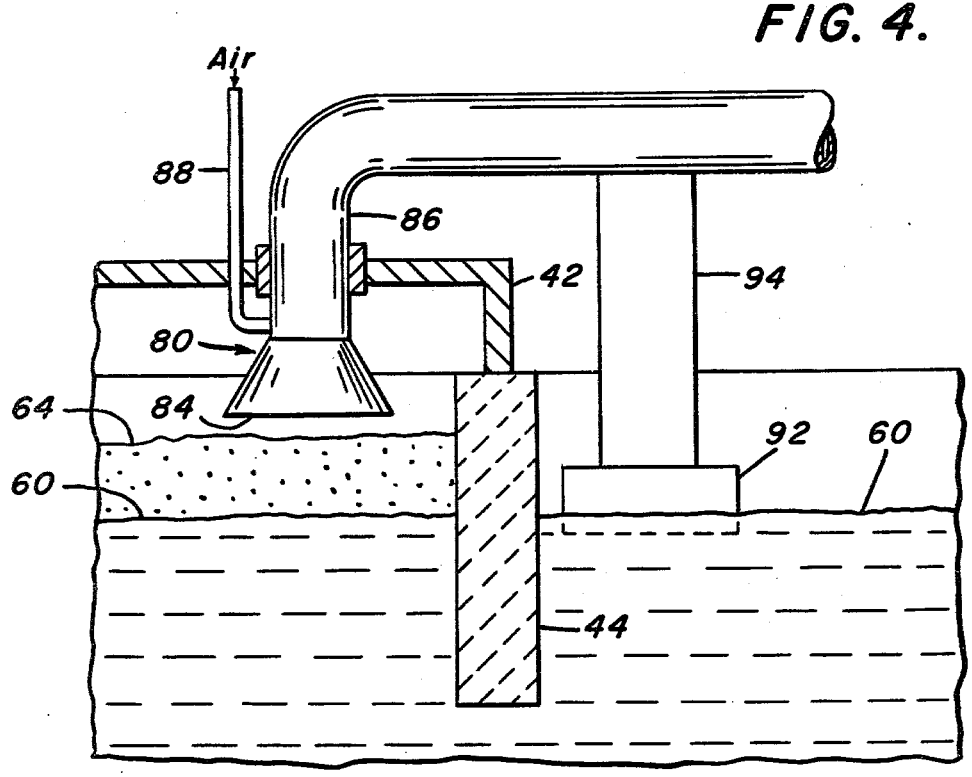
FIG. 4 is an elevational view in cross section illustrating level control for the apparatus for removing treated skim.

By reference to FIG. 4 it will be noted that the mouth of the funnel can be set up so as to adjust itself more or less automatically to the height of surface 60 of molten metal contained in fluxing bay 30. Accordingly, tubular member 86 is indirectly supported by or at least regulated by the height or level of surface 60 of the molten metal. As illustrated in FIG. 3, a simple float 92 having a rigid member 94 fixedly attached to tubular member 86 can achieve the lowering and raising of funnel shaped portion 82 in response to the level of the molten metal to maintain the desired distance between skim surface 64 and funnel mouth 84. It will be appreciated that other means well known to those skilled in the art may be employed to maintain the desired distance between the surface of the skim and the funnel mouth.

A substantial part of the finely divided, particulate material removed has a mesh size in the range of 10 to 325 mesh (Tyler Series). A typical size distribution having three components which add up to 100 percent would be as follows: 5 to 15 wt.% of the finely divided material would have a size between 15 and +60 mesh (U.S. Std. Series) screen and comprise 60 to 80 wt.% free aluminum; 40 to 60 wt.% would have a size of 60 to +200 mesh (U.S. Std. Series) with a free aluminum content of 50 to 70 wt.%; 30 to 50 wt.% would have a size of −200 mesh (U.S. Std. Series) and have a free aluminum content of 20 to 50 wt.%.

In one method of operation of the present invention, molten aluminum (including the skim) is introduced through inlet 48 at a rate in the range of 50,000 to 500,000 lbs/hr, the temperature of the molten aluminum being in the range of 1300° to 1400° F. It will be understood that the molten aluminum will seek a level in bay 30 substantially the same as in the adjacent furnace. Further, it will be noted that molten aluminum will exit bay 30 at a rate substantially commensurate with the rate of introduction thereto. Fluxing gas, such as argon, is fed through hollow shaft 56 at a rate of 20 to 250 SCFH. During the dispensing of the gas for fluxing purposes, shaft 56 and diffuser 50 may be rotated at a rate in the range of 5 to 50 rpm for purposes of providing a mixing action in skim layer 62 utilizing prongs or arms 58. It will be understood that other means may be used to provide the mixing action in the skim layer and are contemplated within the purview of the invention. Further, in the method of the invention, air is introduced through conduit or pipe 88 to create a vacuum and finely divided particles of treated skim are removed through conduit 86 to a collector.

In the present invention, argon or a gas similar to the fluxing gas may be used for purposes of providing the sucton force. After separation of the gas and the particles of skim at the collector (not shown), the gas may be returned and reused in the system. A system in which the present invention can have particular application is described in U.S. Pat. No. 3,997,336, incorporated herein by reference.

In the foregoing description and in the illustrations of the invention, removal of the finely divided particles of treated skim has been achieved by employing a vacuum means. However, it should be understood that removal of the particles of such skim is also contemplated under pressure conditions. That is, since cover 42 can provide an air tight seal with bay walls 44, gas may be introduced into the space between cover 42 and skim layer 62 and permitted to exit through conduit 86 at a controlled rate carrying with it particles of treated skim. For example, gas may be introduced to the space under cover 42 through prongs 58 thereby aiding in the mixing action which permits free aluminum to return to the molten body of aluminum.

While the present invention has been described hereinbefore with reference to a scrap reclamation system, its application is not necessarily limited thereto. That is, the present invention may be used to remove skim in any body of molten aluminum; for example, it may be used in conjunction with a melting furnace.

While the invention has been described in terms of preferred embodiments, the claims appended hereto are intended to encompass other embodiments which fall within the spirit of the invention.

What is claimed is:

1. A method of removing the skim from molten aluminum and alloys thereof and simultaneously therewith reducing the amount of aluminum removed with the skim comprising the steps of:
   (a) providing a body of molten aluminum containing skim;
   (b) passing a gas therethrough to carry particles of skim to the surface of the molten aluminum;
   (c) treating the skim on the surface of the molten aluminum to reduce the amount of aluminum contained therein and to provide said skim in a substantially powdery form, the treatment characterized by being adapted to permit aluminum trapped in the skim to return to said body; and
   (d) removing a portion of the treated skim from the surface of the body of molten aluminum.

2. The method according to claim 1 wherein said skim in powdery form is removed by employing a vacuum.

3. The method according to claim 1 wherein the fluxing gas comprises at least one of the group consisting of helium, neon, argon, kryton, xenon, nitrogen, carbon dioxide and chlorine.

4. The method according to claim 1 wherein the temperature of the body of molten aluminum is in the range of 1300° to 1400° F.

5. A method of removing skim from molten aluminum or alloys of aluminum and simultaneously therewith reducing the amount of aluminum removed with the skim comprising the steps of:
   (a) providing a body of molten aluminum containing skim, the body having a temperature in the range of 1300° to 1400° F.;
   (b) passing a gas therethrough to carry particles of skim to the surface thereof, the gas being at least one selected from the group consisting of helium, neon, argon, krypton, xenon, nitrogen, carbon dioxide and chlorine;
   (c) treating the skim on the surface of the body to reduce the amount of aluminum contained therein and to provide said skim in a substantially powdery form; and
   (d) employing a vacuum to remove a portion of the treated skim from the surface of the body of molten aluminum.

6. A method of continuously removing skim from molten aluminum and alloys thereof and simultaneously therewith reducing the amount of aluminum removed with the skim comprising the steps of:
   (a) providing a body of molten aluminum in a fluxing bay;
   (b) introducing a stream of molten aluminum to the fluxing bay;
   (c) simultaneously with the introducing, passing a gas through the body of molten aluminum to carry particles of skim to the surface of the body to form a layer of skim thereon;
   (d) transferring molten aluminum from the bay at a rate substantially commensurate with the rate of introduction thereto;
   (e) treating the layer of skim to reduce the amount of molten aluminum contained therein and simultaneous therewith to provide the skim having reduced molten aluminum therein in a powdery form; and
   (f) removing a portion of the treated skim to a collector.

7. The method according to claim 6 wherein said skim in powdery form is removed by employing a vacuum.

8. In an improved method for fluxing molten aluminum and alloys thereof to remove skim therefrom in a recirculating system having a heating bay and a fluxing bay wherein molten aluminum is circulated from the heating bay to the fluxing bay and back to said heating bay, the fluxing bay being generally circular in cross section and containing a body of molten aluminum therein, the skim removed therefrom having a reduced amount of aluminum contained therein, said improvement comprising:
   (a) simultaneously with circulating molten aluminum from the heating bay to the fluxing bay, passing a gas through the body of molten aluminum in the fluxing bay to carry particles of skim to the surface of the body to form a layer of skim thereon;
   (b) treating the layer of skim to reduce the amount of molten aluminum contained therein and simultaneous therewith to provide the skim having reduced molten aluminum therein in a powdery form; and
   (c) removing a portion of the treated skim to a collector.

9. The method according to claim 8 wherein a vacuum is employed for purposes of removing a portion of the treated skim.

10. In an improved method of fluxing aluminum or an aluminum alloy to remove skim therefrom in a recirculating system having a heating bay, a pumping bay and a fluxing bay wherein in the system, molten aluminum at a temperature in the range of 1300° to 1475° F. is circulated from said heating bay to said pumping bay and through said fluxing bay back to said heating bay, the fluxing bay being generally circular in cross section and containing a body of molten aluminum, the skim removed therefrom having a reduced amount of aluminum contained therein, said improved method comprising:

(a) simultaneously with circulating molten aluminum from the pumping bay, passing a gas through the body of molten aluminum in the fluxing bay to carry particles of skim to the surface of the body to from a layer of skim thereon;

(b) transferring molten aluminum from the fluxing bay at a rate substantially commensurate with the rate of introduction thereto;

(c) treating the layer of skim to substantially reduce the amount of aluminum contained therein and simultaneous therewith to provide the skim having reduced aluminum therein in a powdery form; and (d) removing a portion of the treated skim to a collector.

11. The method according to claim 10 wherein aluminum scrap is melted in the molten aluminum as it is circulated in the recirculating system.

12. The method according to claim 10 wherein aluminum scrap is melted in the system prior to the molten metal being introduced to the fluxing bay.

13. The method according to claim 10 wherein aluminum scrap is melted in the pumping bay.

* * * * *